US008364175B1

(12) United States Patent
Oroskar et al.

(10) Patent No.: US 8,364,175 B1
(45) Date of Patent: Jan. 29, 2013

(54) RAPID PAGING BASED ON PAGING-CHANNEL OCCUPANCY AND LAST-CALL TIMER

(75) Inventors: Siddharth S. Oroskar, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 116 days.

(21) Appl. No.: 13/053,145

(22) Filed: Mar. 21, 2011

(51) Int. Cl.
*H04W 68/00* (2009.01)
(52) U.S. Cl. .............. 455/458; 455/435.1; 455/456.1; 370/310.2; 370/328; 370/329; 370/330
(58) Field of Classification Search .......... 455/435.1, 455/456.1, 458; 370/310.2, 328, 329, 330
See application file for complete search history.

(56) References Cited

U.S. PATENT DOCUMENTS

| 5,907,810 | A * | 5/1999 | Subramanian et al. | 455/458 |
| 6,268,802 | B1 * | 7/2001 | Foladare et al. | 340/7.2 |
| 7,460,858 | B2 * | 12/2008 | Boland et al. | 455/412.2 |
| 7,480,510 | B1 * | 1/2009 | Woleben et al. | 455/453 |
| 8,027,693 | B2 * | 9/2011 | Del Signore et al. | 455/458 |
| 8,060,089 | B1 * | 11/2011 | Bhan et al. | 455/435.1 |
| 8,224,357 | B2 * | 7/2012 | Del Signore | 455/458 |
| 2005/0009534 | A1 * | 1/2005 | Harris et al. | 455/453 |

FOREIGN PATENT DOCUMENTS

WO 9306685 4/1993

OTHER PUBLICATIONS

U.S. Appl. No. 12/371,165, filed Feb. 13, 2009 entitled "Method and System for Zone Based Paging Based on Congestion".
U.S. Appl. No. 12/699,273, filed Feb. 3, 2010 entitled "Dynamic Paging Concatenation".
U.S. Appl. No. 12/854,119, filed Aug. 10, 2010 entitled "Paging Scheme Settings of Switch Bases on Likelihood of Roaming".
Wan, Guang et al., A Dynamic Paging Scheme for Wireless Communication Systems, Department of Computer Science and Engineering, Southern Methodist University, Dallas, TX.

* cited by examiner

*Primary Examiner* — Olumide T Ajibade Akonai (57) ABSTRACT

Exemplary methods and systems involve a determination of when a rapid page attempt should be made in the sector where a mobile station's last call ended, before zone-based paging is initiated. An exemplary method may involve a radio access network: (a) determining that a mobile station should be paged; (b) before sending the page, the RAN determining whether or not both: (i) a rapid page attempt to the mobile station is likely to succeed, wherein a last call of the mobile station ended in a sector within a first paging zone, and (ii) the rapid page attempt to the mobile station is likely to reduce paging-channel occupancy in the first paging zone; (c) if it is determined that both: (i) the rapid page attempt to the mobile station is likely to succeed and (ii) the paging-channel occupancy is above the threshold level in at least one other sector in the first paging zone, then the RAN making a rapid page attempt in the sector of the radio access network in which the last call ended; and (d) otherwise, the RAN using a zone-based paging scheme to page the mobile station.

20 Claims, 9 Drawing Sheets

RAPID PAGING BASED ON PAGING-CHANNEL OCCUPANCY AND LAST-CALL TIMER

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet.

When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. And the switch and/or gateway, in turn, may control one or more base station controllers and generally control wireless communications, by performing functions such as receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Each sector may have a limited number of traffic channels that its serving base station can assign at any given time (e.g., for concurrent use by numerous mobile stations, or for other use). In CDMA, for instance, each traffic channel may be defined by encoding with a particular "Walsh code," yet the sector may have a limited pool of such Walsh codes. Alternatively, in time division multiplex systems, such as TDMA or 1xEV-DO (e.g., the 1xEV-DO forward link for instance), traffic channels may be defined through interleaved timeslots on the air interface.

Furthermore, each sector may define an air interface "paging channel" on which the serving base station can send access probe acknowledgements and traffic channel assignment messages to served mobile stations. The paging channel may have limited capacity. (Further, if multiple access channels are provided, they may cooperatively have limited capacity.) For instance, the paging channel may define timeslots in which the base station can send various messages to particular mobile stations. If the base station has numerous such messages to send, however, the paging channel can become congested and can thereby delay call setup or the like.

When a switch in a cellular wireless communication system seeks to page a mobile station (e.g., for an incoming call or for some other reason), the switch can send the page message to numerous base stations in the switch's coverage area, with the hope that when the base stations broadcast the page message, the mobile station will receive the page message in one of the associated sectors and will respond. Given the scarcity of paging channel resources, however, most modern cellular networks are instead arranged to engage in a more targeted paging process known as "zone based paging."

With zone based paging, a cellular network is divided into paging zones, each with a respective zone ID, and paging is performed on a zone-basis. To facilitate this, each base station in the system may broadcast as one of its overhead parameters the zone ID for the zone in which the base station is located. Mobile stations operating in the network may then programmatically monitor the zone IDs indicated in the overhead messages and may automatically register with the network when they detect that they have moved into a new zone, or for other reasons. To register with the network, a mobile station may send a registration message via the access channel in its current sector, and a switch in the network would note the mobile station's registration and convey an indication of the registration to a home location register for later reference.

With this process, the registration records thereby maintained by switches and/or home location registers will indicate the paging zone in which each mobile station last registered. When a switch seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone. Once the designated base stations transmit the page message, if the mobile station does not respond to the page, the switch may then broaden the scope of the page, by sending the page message to a wider range of paging zones and perhaps ultimately to all base stations in the switch's serving area.

Overview

In existing zone-based paging schemes the first page attempt is typically made in all sectors in the zone in which a mobile station last registered. The inventors have recognized that doing so may be unnecessary, if the specific sector in which a mobile station is located can be identified with a reasonable degree of a certainty. Accordingly, an exemplary embodiment may involve making a "rapid page attempt," which involves the transmission of a page in only the sector where a mobile station's last call ended (referred to herein as the "last-call sector"), when it is determined that the mobile station is likely to still be located in in the sector where the mobile station's last call ended. When a rapid page attempt is successful, a page will not be sent in the other sectors in the zone, which may help to reduce the paging-channel occupancy (PCO) in these sectors (as compared to when a zone-based paging scheme is implemented).

When a rapid page attempt fails, however, this may actually delay a page, as it is possible the mobile station could have received the page more quickly if the RAN had just initiated the zone-based paging process immediately, rather than first making the rapid page attempt. Further, since the RAN preferably resorts to zone-based paging when a rapid page attempt fails, the potential reduction in paging-channel occupancy is not realized unless the rapid page attempt succeeds. There is thus a tradeoff between the potential reduction in paging-channel occupancy and the possibility that a rapid page attempt might delay a page reaching the intended mobile station. As such, an exemplary method may further involve the determining whether the paging-channel occupancy is high in sectors where the paging-channel occupancy could be reduced (e.g., sectors where a page would be sent under a zone-based paging scheme, but are not sent if a rapid page succeeds), and only making a rapid page attempt when it is determined that the paging-channel occupancy should be reduced.

In one aspect, an exemplary method involves a radio access network: (a) determining that a mobile station should be paged; (b) before sending the page, determining whether or not both: (i) less than a predetermined period of time has elapsed since a last call of the mobile station ended, wherein the last call ended in a sector within a first paging zone, and (ii) paging-channel occupancy is above a threshold level in at least one sector in the first paging zone other than the sector in which the last call ended; (c) if it is determined that both: (i) less than the predetermined period of time has elapsed since the last call of the mobile station ended and (ii) the paging-channel occupancy is above the threshold level in at least one other sector in the first paging zone, then making a rapid page attempt in the sector of the radio access network in which the last call ended; and (d) otherwise, using a zone-based paging scheme to page the mobile station.

In another aspect, an exemplary radio access network system may include a non-transitory computer-readable medium and program instructions stored on the non-transitory computer-readable medium and executable by at least one processor to: (a) determine that a mobile station should be paged; (b) before sending a page to the mobile station, determine whether or not both: (i) less than a predetermined period of time has elapsed since a last call of the mobile station ended, wherein the last call ended in a sector within a first paging zone, and (ii) paging-channel occupancy is above a threshold level in at least one sector in the first paging zone other than the sector in which the last call ended; (c) if it is determined that both: (i) less than the predetermined period of time has elapsed since the last call of the mobile station ended and (ii) the paging-channel occupancy is above the threshold level in at least one other sector in the first paging zone, then cause a RAN component to initiate a rapid page attempt in the sector of the radio access network in which the last call ended; and (d) otherwise, cause the RAN component to implement a zone-based paging scheme to page the mobile station.

In yet another aspect, an exemplary method may involve a radio access network: (a) determining that a mobile station should be paged; (b) before sending the page, determining whether or not both: (i) a rapid page attempt to the mobile station is likely to succeed, wherein a last call of the mobile station ended in a sector within a first paging zone, and (ii) the rapid page attempt to the mobile station is likely to reduce paging-channel occupancy in the first paging zone; (c) if it is determined that both: (i) the rapid page attempt to the mobile station is likely to succeed and (ii) the paging-channel occupancy is above the threshold level in at least one other sector in the first paging zone, then making a rapid page attempt in the sector of the radio access network in which the last call ended; and (d) otherwise, using a zone-based paging scheme to page the mobile station.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
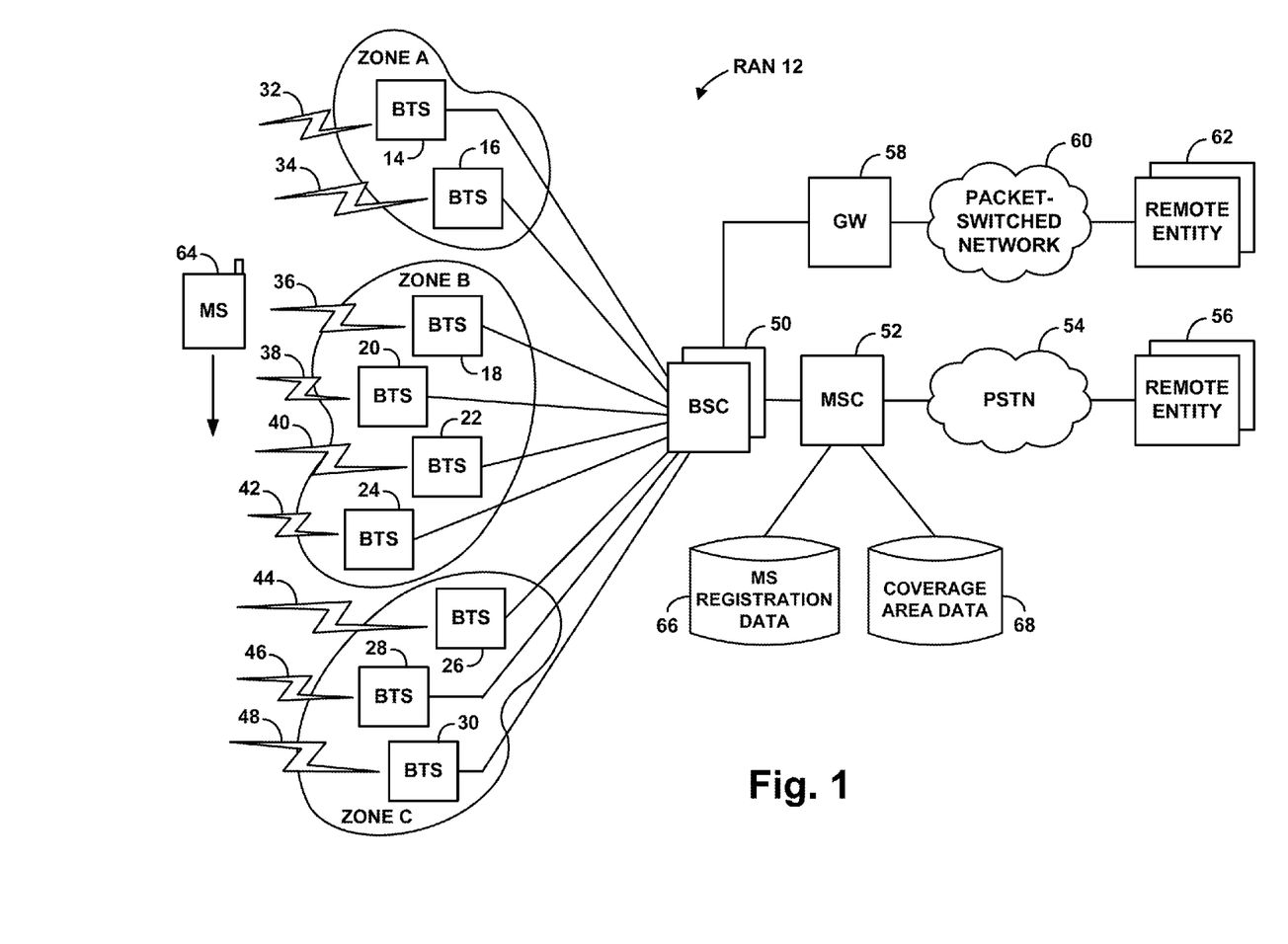
FIG. 1 is a simplified block diagram of a communications network in which an exemplary embodiment can be implemented.

Referring to the drawings, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor or processors executing program instructions stored in memory or another machine-readable medium (i.e., data storage, rather than a mere signal), to achieve the useful, concrete, and tangible result of determining whether or not to make a rapid page attempt.

As shown in FIG. 1, the exemplary network includes at its core a radio access network (RAN) 12 that radiates to define numerous coverage areas in which mobile stations can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas 32-48 as shown and to communicate with mobile stations in those coverage areas.

The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance. For simplicity, the term "sector" should be understood herein to encompass the smallest type of coverage area in a given RAN, and thus may refer to a cell in a RAN where cells are not subdivided into sectors, or to a cell sector in a RAN where cells are divided as such, or to a coverage area defined in some other manner.

As shown, each base station controller may be coupled with a mobile switching center or other switch 52 that provides connectivity with the public switched telephone network (PSTN) 54 if applicable, so that served mobile stations can communicate with remote entities 56 on the PTSN. And each base station controller may be coupled with a packet data serving node (PDSN) or other gateway 58 that provides connectivity with a packet-switched network 60 if applicable, so that served mobile stations can communicate with remote entities 62 on the packet-switched network.

FIG. 1 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted above for instance. Further, it is understood that the term "mobile station" does not necessarily mean that the device is movable; the term connotes a wireless communication device generally, whether movable or at a fixed position.

In FIG. 1, the base stations 14-30 are grouped into zones A, B, and C, to facilitate zone-based paging as described above. As such, each base station 14-30 may broadcast a zone ID indicating its zone, and a mobile station such as mobile station 64 may monitor the zone IDs broadcast in the coverage areas where the mobile station is operating. When the mobile station detects a change in zone ID, the mobile station may then responsively register its presence in the new zone, so that the RAN would then know to page the mobile station in that new zone.

To facilitate zone-based paging, MSC 52 may include or have access to mobile station registration data 66 and coverage area data 68. The mobile station registration data 66 preferably comprises data that specifies per mobile station where the mobile station is currently registered, such as the zone in which the mobile station is currently registered, among possibly other information. The mobile station registration data 66 can take the form of a visitor location register (VLR) database, which holds a record per mobile station in the MSC's service area. The mobile station's current zone of registration may accordingly be indicated by the mobile station's VLR record. Alternatively or additionally, the mobile station registration data can take the form of a home location register (HLR) database that is accessible by the MSC. Still alternatively, the data may be stored internally at the MSC or elsewhere in some other form.

The coverage area data 68 preferably comprises data that specifies per coverage area (i) what zone the coverage area is in, (ii) what other coverage area(s) are directly adjacent to the coverage area, and (iii) whether the coverage area is currently congested or not. For example, the data may indicate on a per-sector basis, the zone that the sector is part of, as well as the paging channel occupancy level (PCO) of that sector. The coverage area data 68 may also include data on a per-zone basis. For instance, coverage area data 68 may also include a separate record per zone, which lists the coverage areas in the zone. In such embodiments, coverage area data 68 may further include per-zone data indicating the average paging-channel occupancy over all sectors in a given zone or a subset of sectors in the given zone.

The paging-channel occupancy for a given sector or for a given zone may take the form of a percentage, which indicates the percentage of bandwidth allocated for the paging channel that is in use or scheduled to be in use. The paging-channel occupancy may take other forms as well.

The coverage area data 68 may be set through manual input by network designers and/or may be dynamically modified based on RF conditions or for other reasons. For instance, the zones and what sectors are included therein may be defined by network designers, while the paging-channel occupancy data for the various sectors may be updated periodically or continually based on substantially current network conditions.

Note that the coverage area data 68 may include other data as well. For instance, if coverage areas could be cells or cell sectors, a coverage area record regarding a cell may specify sectors of the cell, and a coverage record regarding a sector may specify the cell of which the sector is a part. Other examples are possible as well.

Figure 2:
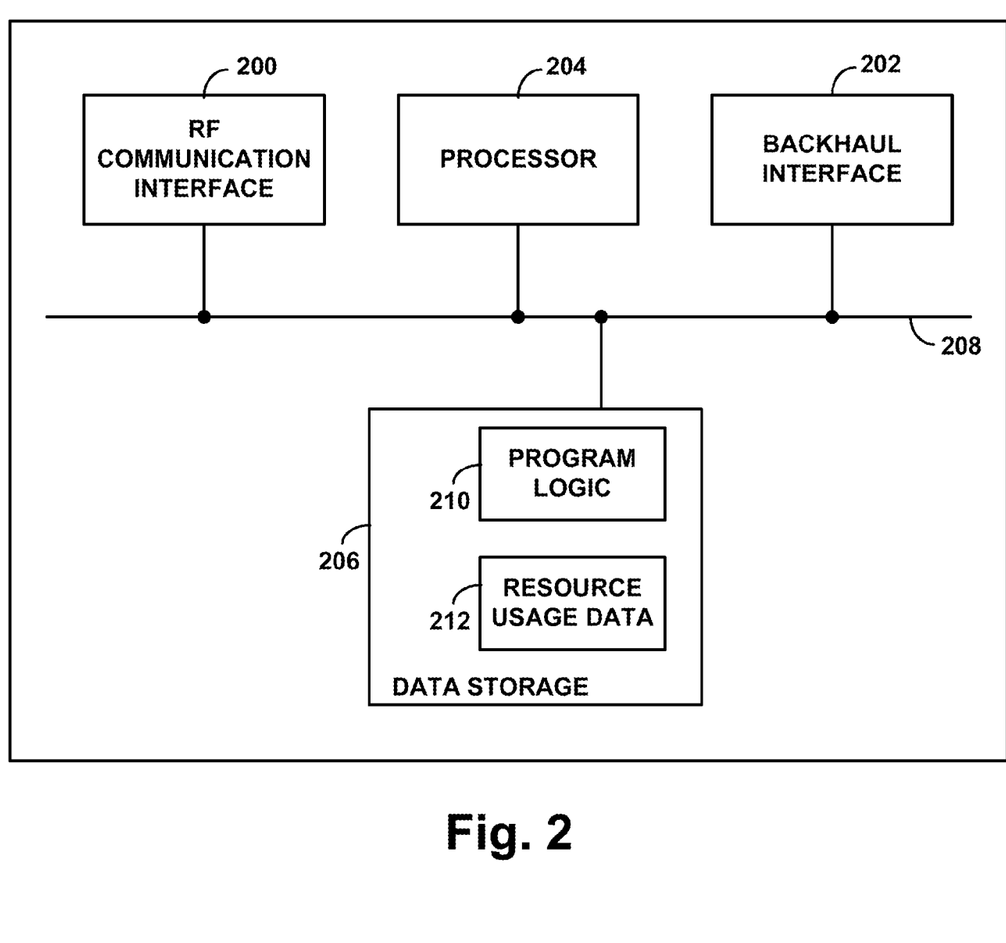
FIG. 2 is a simplified block diagram showing functional components of an exemplary base station.

FIG. 2 is a simplified block diagram showing functional components of an exemplary base station or any other entity arranged to carry out analogous functions. As shown, the base station includes an RF communication interface 200, a backhaul interface 202, a processor 204, and data storage 206, all of which may be communicatively linked together by a system bus, network, or one or more other connection mechanisms 208.

RF communication interface 200 may comprise one or more antenna structures, one or more power amplifiers, and associated equipment, for engaging in RF communication with mobile stations operating within the base station's coverage, according to one of the air interface protocols noted above for instance. Backhaul interface 202 may comprise any sort of communication link or mechanism enabling the base station to exchange signaling and bearer data with other RAN entities such as with BSC 50, or via BSC 50 with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204.

As further shown, data storage 206 preferably contains program logic (e.g., machine language instructions) 210 executable by processor 204 to carry out various base station functions described herein. Further, data storage 206 preferably contains or can contain resource usage data 212, such as data indicating total resources, current resource usage, and thus the extent to which resources are or are not currently available, on a sector by sector basis, and data indicating whether each of one or more coverage areas of the base station is currently experiencing threshold congestion in terms of any or all of the resources noted above and/or other resources. Such resource usage data 212 may include paging-channel occupancy data on a sector by sector basis, for example. Other types of resource usage data are also possible.

Figure 3:
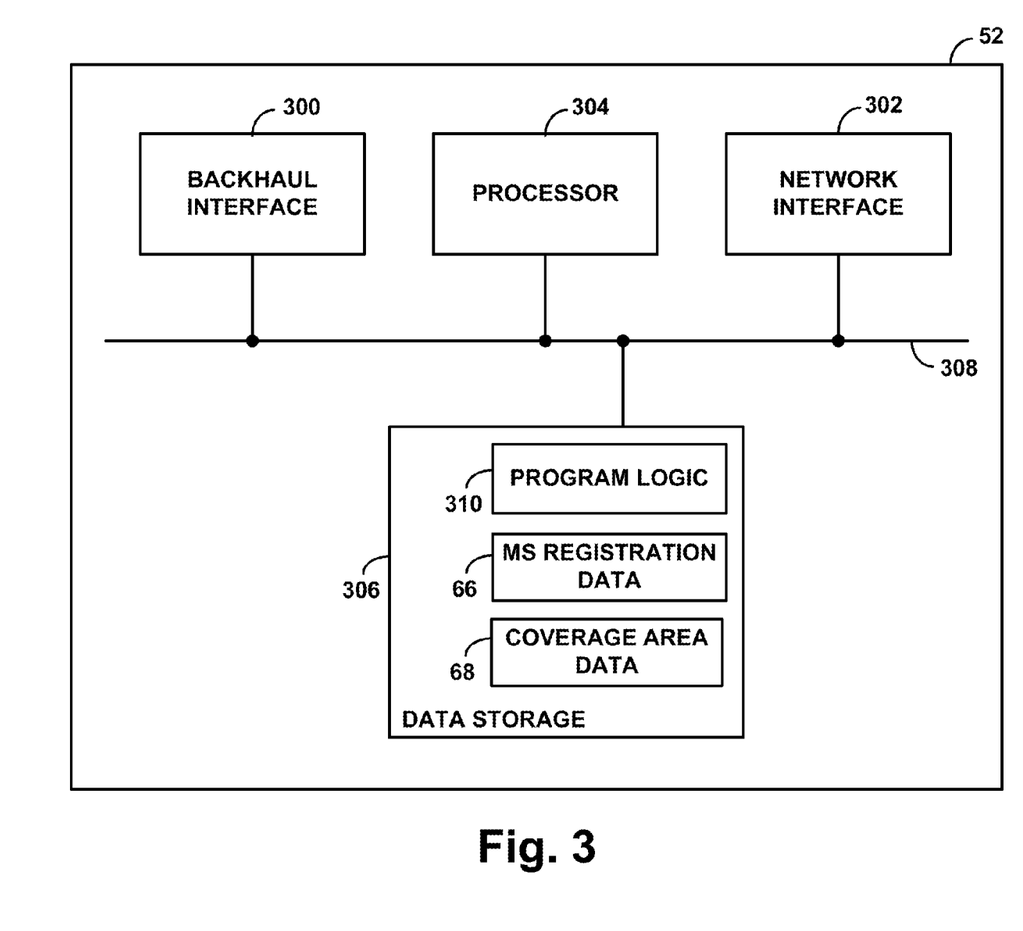
FIG. 3 is a simplified block diagram showing functional components of an exemplary mobile switching center.

FIG. 3 is a simplified block diagram showing functional components of an exemplary MSC 52, or any other entity or entities arranged to carry out analogous functions. As shown, the MSC 52 includes a backhaul interface 300, a network interface 302, a processor 304, and data storage 306, all of which may be communicatively linked together by a system bus, network, or one or more other connection mechanisms 308.

Processor 304 may comprise one or more processors (e.g., general purpose and/or special purpose processors), such as microprocessors for instance. And data storage 306 may comprise one or more volatile and/or non-volatile storage components, such as magnetic, optical, or organic storage components, integrated in whole or in part with processor 304. As further shown, data storage 306 preferably contains program logic (e.g., machine language instructions) 310 executable by processor 304 to carry out various MSC functions described herein. Further, data storage 306 may contain the mobile station registration data 66 and/or the coverage area data 68, such as a copy of part or all of that data, for convenient access by the MSC processor 304.

Backhaul interface 300 may comprise any sort of communication link or mechanism enabling the MSC to exchange signaling and bearer data with other RAN entities such as with BSC 50, or via BSC 50 with various base stations for instance. Network interface 302 may comprise any sort of interface enabling MSC 52 to exchange signaling and bearer data for PSTN communication and perhaps to access mobile station registration data 66 and/or coverage data 68 if the data is accessible in that manner.

In an exemplary embodiment, the MSC 52 may also function to maintain coverage area data 68 by acquiring paging-channel occupancy data from various base stations, and storing the paging-channel occupancy data in a coverage area database. Additionally or alternatively, MSC 52 may be configured to access a coverage area database, which may include paging-channel occupancy data, and which is maintained by another entity or entities. In such an embodiment, coverage area data 68 may take the form of data acquired from such a coverage area database.

In a further aspect, MSC 52 may track subscriber usage for any number of reasons, such as to facilitate billing and performance monitoring. To do so, for each call that the MSC 52 handles, MSC 52 may generate a Call Detail Record (CDR). The CDR may take various forms but often includes certain information about the call, such as the originating number, terminating number, the sector or sectors in which the call occurred, start time, stop time, and/or call type (e.g., local or long-distance, voice or data, and so on). MSC 52 may transmit these CDRs to a central entity that maintains a database in which the CDRs are compiled. It should be understood that RAN components other than MSCs may generate CDRs in addition to or instead of MSC 52 generating CDRs.

In an exemplary embodiment, CDRs may indicate the time at which a given call ended, and for each mobile station involved in the call, the location or locations of the mobile station during the call (e.g., the sector(s) and/or zone(s) in which the mobile station was located throughout the call). As such, an MSC 52 may use CDRs (e.g., by accessing a service-provider-maintained database compiling data from CDRs) to determine the sector in which a mobile station was located when the mobile station ended its last call. In addition, MSC 52 may determine, based on the time that the last call ended, the period of time that has elapsed since the end of the last call.

Figure 4A:
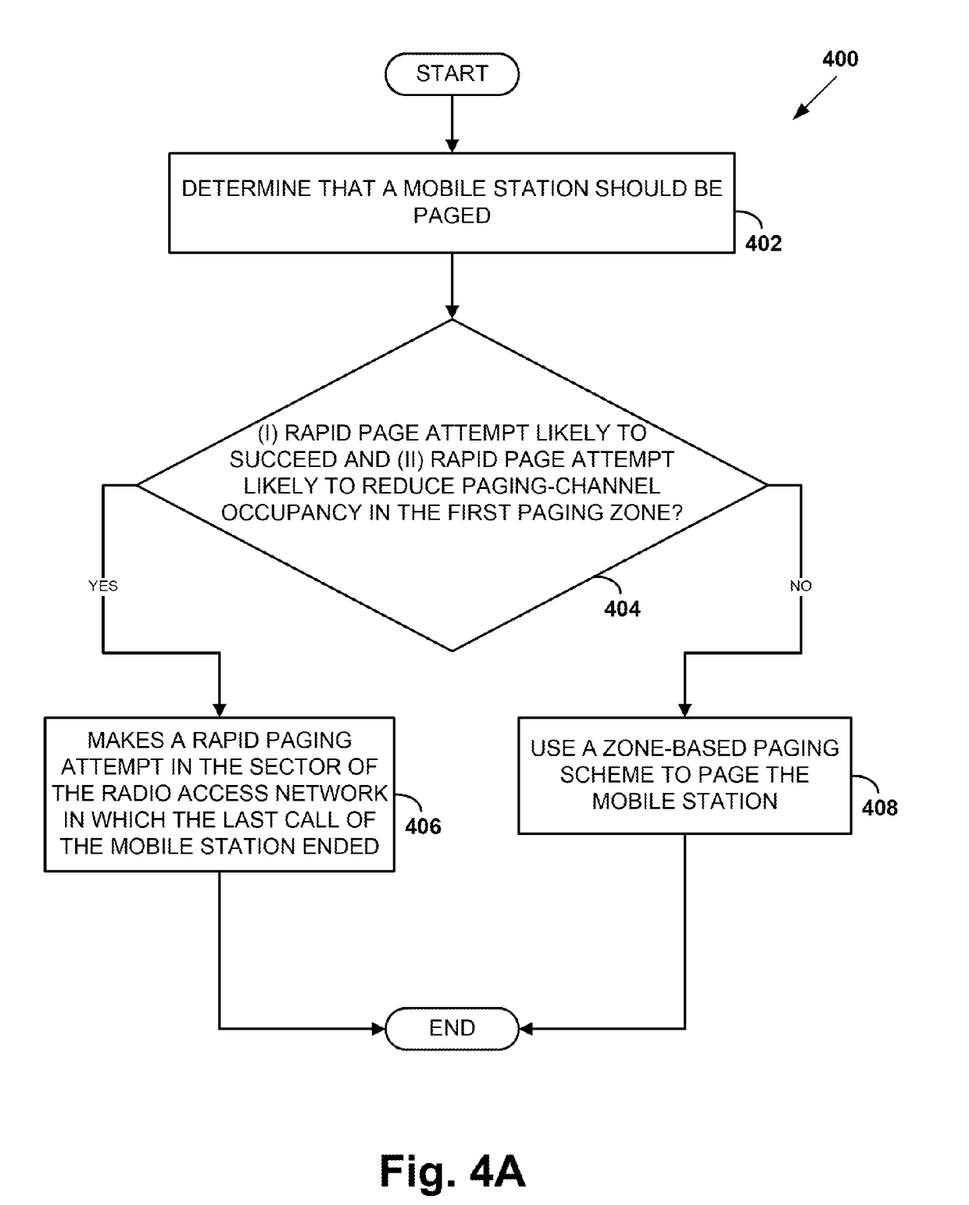
FIG. 4A is a flow chart illustrating a method according to an exemplary embodiment.

FIG. 4A is a flow chart illustrating a method 400 according to an exemplary embodiment. Generally, method 400 may be implemented by a RAN to determine whether or not to initiate a rapid page attempt before resorting to zone-based paging (if necessary). To make this determination, the RAN may consider: (a) whether or not a rapid page attempt is likely to succeed, and (b) whether or not the potential paging-channel occupancy reduction from a successful rapid page attempt is needed or could be beneficial. References to functions as being performed by a RAN should be understood to disclose embodiments in which the functions may be carried out by a RAN component, such as an MSC, or by one or more RAN components. As such, the method 400 may be carried out by a RAN component or a combination of RAN components in order to page a mobile station. For instance, method 400 may be carried out by a base station (i.e., a BTS and/or a BSC), by an MSC, or by the combination of a base station and an MSC, among other examples.

More specifically, method 400 involves the RAN determining that a mobile station should be paged, as shown by block 402. Then, before paging the mobile station, the RAN determines whether or not both: (i) a rapid page attempt to the mobile station is likely to succeed, wherein a last call of the mobile station ended in a sector within a first paging zone, and (ii) the rapid page attempt to the mobile station is likely to reduce paging-channel occupancy in the first paging zone, as shown by block 404. In an exemplary embodiment, the RAN may determine whether or not a rapid page attempt is likely to succeed by determining whether or not a threshold period of time has elapsed since a last call involving the mobile station ended. If it is determined that both: (i) the rapid page attempt is likely to succeed and (ii) the rapid page attempt is likely to reduce paging-channel occupancy in the first paging zone, then the RAN makes a rapid page attempt in the sector of the radio access network in which the last call ended, as shown by block 406. Otherwise, the RAN uses a zone-based paging scheme to page the mobile station, as shown by block 408.

According to an exemplary embodiment, a "rapid page attempt" is the transmission of a page in only the sector where a mobile station's last call ended (referred to herein as the "last-call sector"). Thus, when a rapid page attempt is successful, and no further attempts need to be made to page the mobile station, the paging-channel occupancy in sectors near the last-call sector may be reduced as compared to the paging-channel occupancy that would result from zone-based paging. In particular, a rapid paging attempt is only made in the last-call sector, whereas a typical zone-based paging scheme specifies that the first attempt to page the mobile involves paging the mobile station in all sectors in the zone of last registration. Therefore, if a rapid page attempt succeeds then the page will not be sent in the other sectors in the zone, which thus reduces the paging-channel occupancy in these sectors (as compared to zone-based paging).

When a rapid page attempt fails, however, this may actually delay a page, as it is possible the mobile station could have received the page more quickly if the RAN had just initiated the zone-based paging process immediately, rather than first making the rapid page attempt. Further, since the RAN preferably resorts to zone-based paging when a rapid page attempt fails, the potential reduction in paging-channel occupancy is not realized unless the rapid page attempt succeeds. There is thus a tradeoff between the potential reduction in paging-channel occupancy and the possibility that a rapid page attempt might delay a page reaching the intended mobile station. Accordingly, method 400 may involve the RAN checking whether the paging-channel occupancy is high in sectors where the paging-channel occupancy could be reduced (e.g., sectors where a page would be sent under a zone-based paging scheme, but are not sent if a rapid page succeeds). Further, method 400 involves the RAN checking if the time since the last call ended is such that it is likely that a mobile station has not traveled out of the last-call sector. As such, the RAN may only initiate a rapid page attempt when the paging-channel occupancy in such sectors is high, and thus might need to reduced, and when the mobile station's last call ended recently enough to infer that a rapid page attempt in the last-call sector is likely to succeed.

In some embodiments, the RAN may determine whether or not a rapid page attempt is likely to reduce paging-channel occupancy in a given paging zone by determining an average paging-channel occupancy for the first paging zone, and whether or not the average paging-channel occupancy is above a threshold level. The average paging-channel occupancy may be determined over all sectors in the first paging zone. Alternatively, the average paging-channel occupancy may be determined over all sectors in the first paging zone, except for the sector in which the last call of the mobile station ended. The average paging-channel occupancy may be determined over other sets of sectors as well.

In other embodiments, the RAN may determine whether or not a rapid page attempt is likely to reduce paging-channel occupancy in a given paging zone by determining whether paging-channel occupancy is above a threshold level in at least one sector in the first paging zone other than the sector in which the last call ended.

Figure 4B:
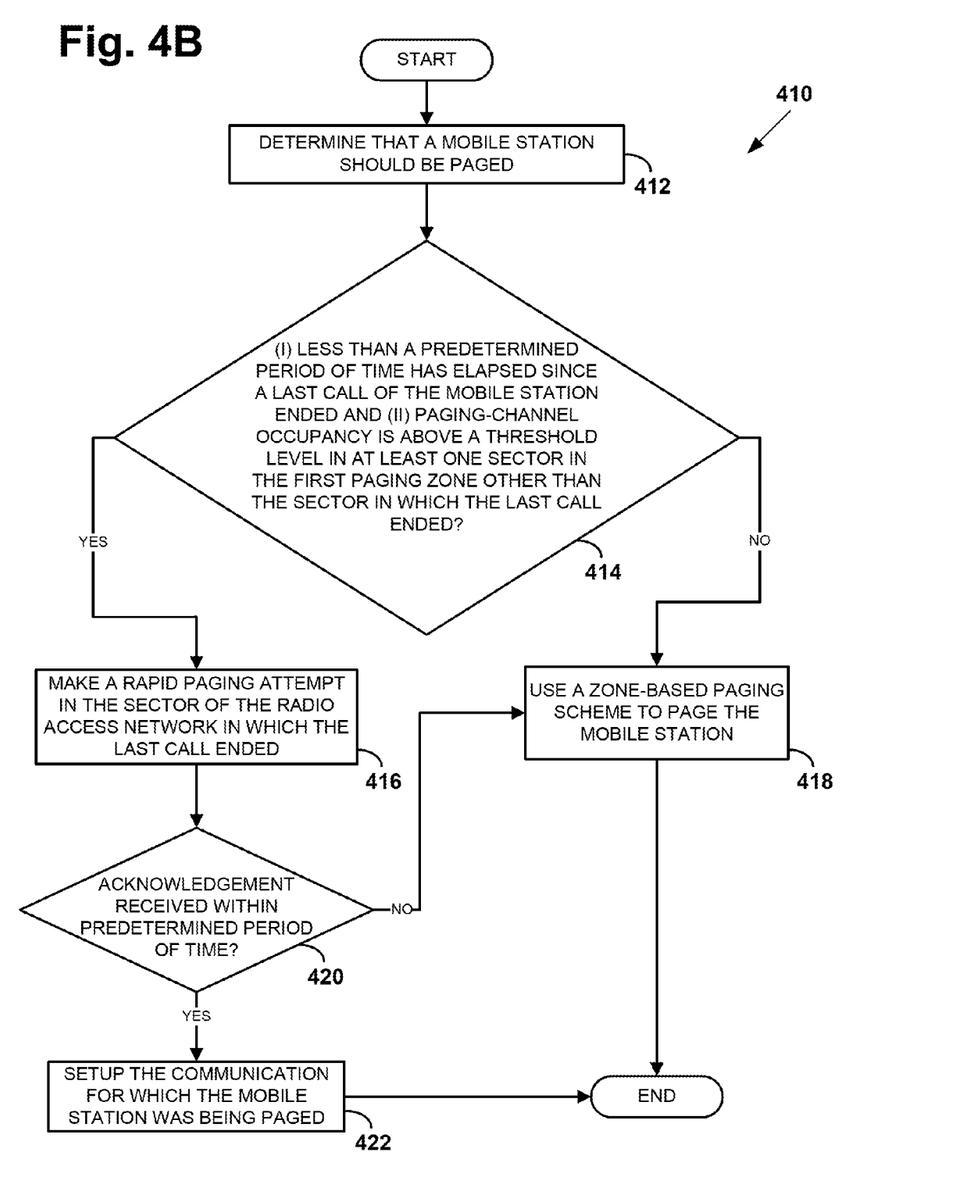
FIG. 4B is another flow chart illustrating a method according to an exemplary embodiment.

FIG. 4B is another flow chart illustrating a method 410, according to an exemplary embodiment. In method 410, the RAN determines whether or not a rapid page attempt is likely to reduce paging-channel occupancy in a given paging zone by considering whether or not paging-channel occupancy is above a threshold level in at least one sector in the first paging zone other than the first paging zone.

More specifically, method 410 involves the RAN initially determining that a mobile station should be paged, as shown by block 412. Then, before paging the mobile station, the RAN determines whether or not both: (i) less than a predetermined period of time has elapsed since a last call of the mobile station ended and (ii) paging-channel occupancy is above a threshold level in at least one sector in the first paging zone other than the sector in which the last call ended, as shown by block 414. If it is determined that both: (i) less than the predetermined period of time has elapsed since the last call of the mobile station ended and (ii) the paging-channel occupancy is above the threshold level in at least one other sector in the first paging zone, then the RAN makes a rapid page attempt in the sector of the radio access network in which the last call ended, as shown by block 416. Otherwise, the RAN uses a zone-based paging scheme to page the mobile station, as shown by block 418.

In the case that conditions (i) and (ii) both hold true and the RAN responsively makes a rapid page attempt, the RAN preferably waits for a predetermined period of time for an acknowledgement from the mobile station, as shown by block 420. If an acknowledgement is received, then the RAN proceeds to setup the communication for which the mobile station was being paged, as shown by block 422. If, on the other hand, no acknowledgement is received from the mobile station within the predetermined period of time, then RAN resorts to the use of the zone-based paging scheme to page the mobile station to page the mobile station, as again shown by block 418.

It should be understood that the order in which the RAN determines whether or not less than a threshold period of time has elapsed since a mobile station's last call ended, and determines whether or not paging-channel occupancy is above a threshold level elsewhere in the first paging zone, may be reversed without departing from the scope of the invention. Further, since block 414 requires that both conditions (i) and (ii) above hold true, the RAN may proceed to RAN use a zone-based paging scheme to page the mobile station once it has been determined that either of (i) or (ii) does not hold true, without necessarily determining whether or not the other condition holds true. For example, the RAN may first check whether paging channel occupancies (PCOs) are high enough in the zone in which a mobile station's last call ended to warrant an attempt to send a "rapid page." And if the paging-channel occupancy is high in at least one sector that could see a paging-channel occupancy reduction from a rapid page, only then does the RAN proceed to determine if the time since a mobile station's last call is less than a threshold period of time.

Figure 4C:
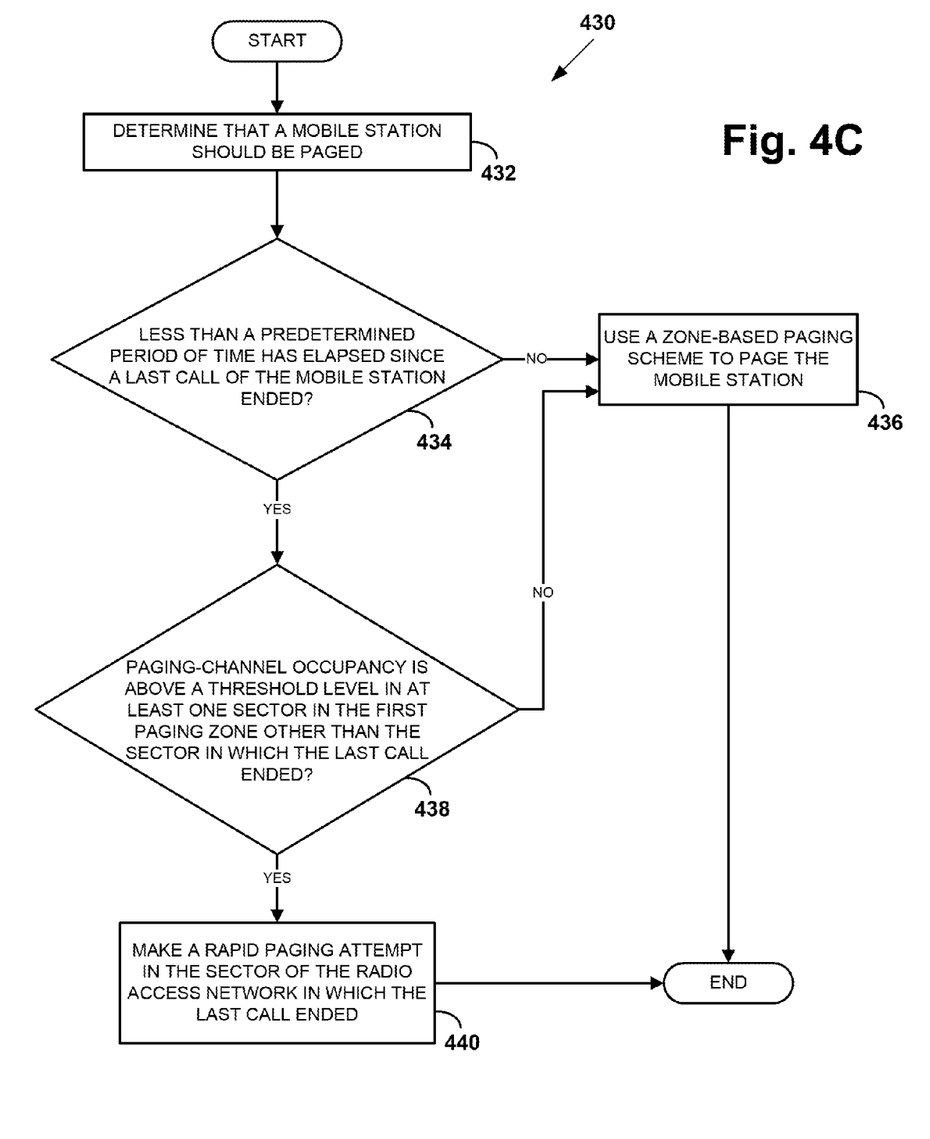
FIG. 4C is another flow chart illustrating another method according to an exemplary embodiment.

FIG. 4C is another flow chart illustrating another method 430, according to an exemplary embodiment. Method 430 is an example of a method in which the RAN determines whether less than a threshold period has elapsed since the mobile station's last call, before (possibly) considering whether or not paging-channel occupancy is above a threshold level elsewhere in the first paging zone.

In particular, method 430 involves the RAN initially determining that a mobile station should be paged, as shown by block 432. Then, before paging the mobile station, the RAN determines whether or not less than a threshold period of time has elapsed since a last call involving the mobile station ended, as shown by block 434. If more than the threshold period of time has elapsed since the mobile station's last call ended, then the RAN may proceed to use a zone-based paging scheme to page the mobile station, as shown by block 436. If, however, less than the threshold period of time has elapsed since a last call involving the mobile station ended, the RAN may interpret this as indication that a rapid page would be likely to succeed, and thus may evaluate the potential benefit of sending a rapid page to the mobile station.

More specifically, the RAN may determine whether or not paging-channel occupancy is above a threshold level in at least one sector in the first paging zone other than the sector in which the last call ended, as shown by block 438. If the paging-channel occupancy is above the threshold level in at least one of the other sectors in the first paging zone, then the RAN determines that it is in fact the case that both: (i) less than the predetermined period of time has elapsed since the last call of the mobile station ended and (ii) the paging-channel occupancy is above the threshold level in at least one sector in the first paging zone other than the sector in which the last call ended. When this is the case, the RAN makes a rapid page attempt in the sector of the radio access network in which the last call ended, as shown by block 440. Otherwise, the RAN proceeds to use a zone-based paging scheme to page the mobile station, as again shown by block 436.

To implement method 430 in practice, an MSC may need to identify which sectors are likely to see a paging-channel occupancy reduction from a successful rapid page attempt, so that the MSC can determine whether or not the paging-channel occupancy is high enough in at least one such sector to justify a rapid page attempt. To do so, the MSC may first acquire CDRs for the mobile station, or query a CDR database, in order to determine the sector in which the mobile station's last call ended. The MSC may then query a zone database to determine the zone that includes the last-call sector, and to determine the other sectors that are included in this zone. The MSC may then determine the paging-channel occupancy for each of the other sectors in the zone, and whether the paging-channel occupancy is above a pre-determined threshold level.

As noted, an exemplary method may further involve the MSC determining the sector in which the last call ended (i.e., the "last-call sector") such as by accessing CDRs that provide such data. It should be understood that the last call of a given mobile station may be a call that was initiated by the given mobile station, a call that was initiated by another mobile station and directed to the given mobile station, or that involved the mobile station in some other manner.

In method 430, the step of determining the paging-channel occupancy for each sector may be accomplished using various techniques. For example, the paging-channel occupancy may be determined based on the number and/or size of the pages that are scheduled for a given timeslot on the paging channel, as well as the number and/or size any overhead messages (ACK messages, etc.) scheduled for transmission during the timeslot. To do so, the base station may calculate the total bandwidth required for transmission of all the page records in a given timeslot to determine and the total bandwidth required for transmission of all overhead messages in the timeslot. (In practice, overhead messages typically occupy the majority of the available paging-channel bandwidth.) The base station may then calculate the paging-channel occupancy as the sum of the bandwidth totals for page records and overhead messages in the timeslot. This sum, indicating a total usage of paging-channel resources, may then be used as the paging-channel occupancy, or alternatively, the paging-channel occupancy may be calculated as the ratio of the total bandwidth for all pages and overhead messages as compared to the total available bandwidth on the paging channel.

In an embodiment where the MSC determines whether paging-channel occupancy is above a threshold level in at least one sector in a zone, other than the last-call sector, the MSC may or may not consider the paging-channel occupancy in all sectors other than the last-call sector. In particular, once the MSC has determined that the paging-channel occupancy is above the threshold level in one such sector, it may conclude that the condition is satisfied, alleviating the need to determine or look up the paging-channel occupancy in the other sectors in the zone. However, it is also possible that the MSC may determine the paging-channel occupancy in all such sectors, without departing from the scope of the invention.

In some embodiments, the paging-channel occupancy may be determined based on pages and overhead messages scheduled for a future timeslot, which is typically the next-occurring timeslot (although later occurring timeslots are also possible). As one specific example, the base station may determine the paging-channel occupancy by adding the total size of the scheduled overhead messages (i.e., the total bandwidth required for transmission) and the total size of the scheduled pages. The paging-channel occupancy may then be calculated as the ratio of this sum as compared to the 1528 bits available in a typical 80 ms paging-channel timeslot (where data is transmitted at 9.6 kb/sec). Alternatively, this sum itself may be considered as the paging-channel occupancy. As another alternative, this sum may be subtracted from the 1528 bits available to determine how many additional pages may be sent in the timeslot. This determination may be based on the typical page record size of 72 bits (plus addressing bits) for each page record.

In a further aspect, the MSC may also use CDRs for the mobile station in order to determine whether more than the threshold period has elapsed since the last call ended. For example, the MSC may query a database, such as a coverage area database that includes paging-channel occupancy data, in order to determine a time when the last call of the mobile station ended. The MSC may then determine an elapsed time since the last call of the mobile station ended. It should be understood, however, that in other embodiments, various other techniques may be used to determine the elapsed time since a last call ended, without departing from the scope of the invention.

Figure 4D:
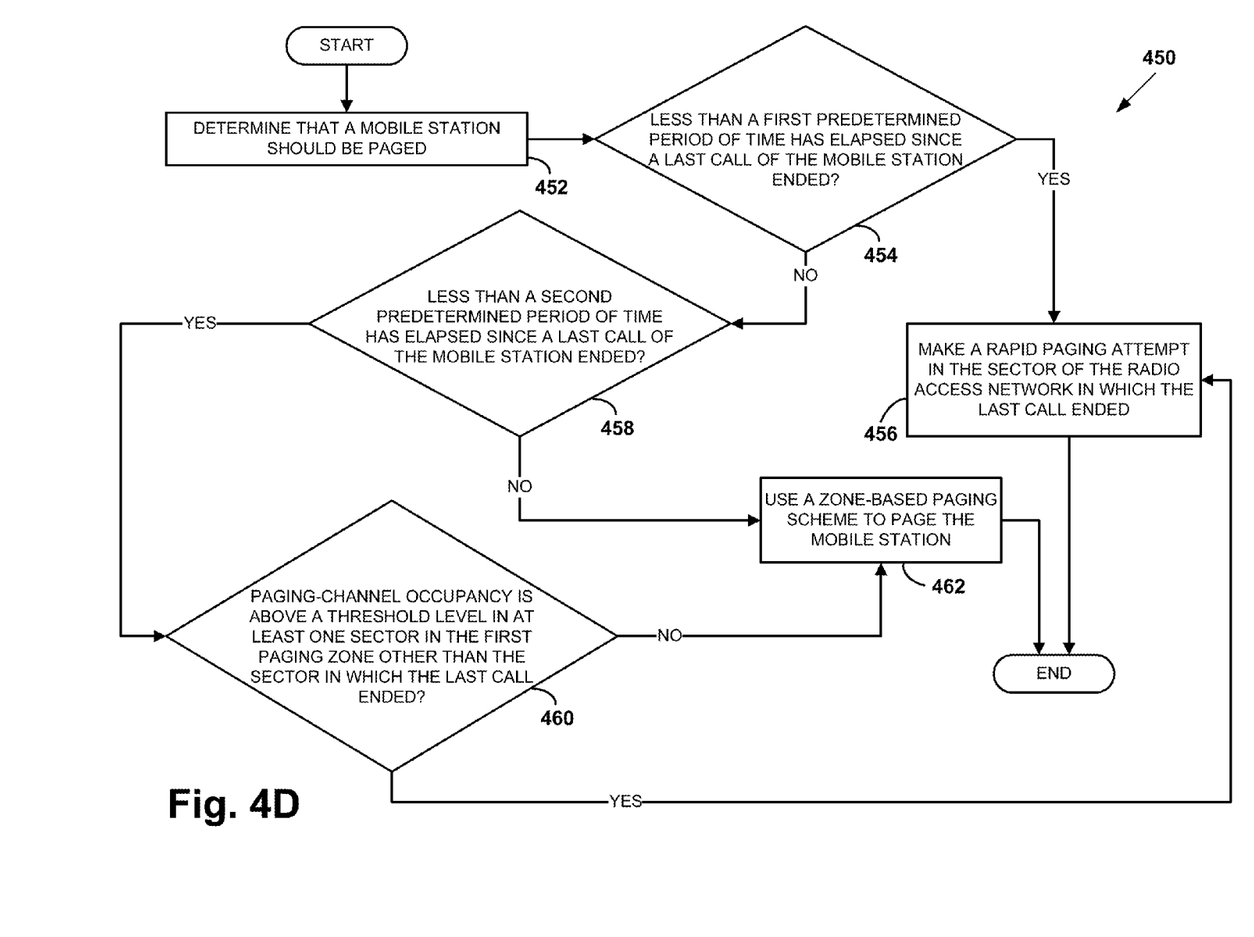
FIG. 4D is another flow chart illustrating method according to an exemplary embodiment.

FIG. 4D is another flow chart illustrating another method 450, according to an exemplary embodiment. Method 450 is an example in which the RAN evaluates the elapsed time since a mobile station's last call with further granularity. As such, the RAN may attempt a rapid page if the elapsed time is less than a first threshold period of time, without checking whether the paging-channel occupancy is above a threshold in any sector. However, if the elapsed time is greater than the first threshold, but still less than a second threshold, the RAN may proceed to determine the appropriate paging-channel occupancies and decide whether or not to make a rapid page attempt based thereon.

In particular, method 450 involves the RAN initially determining that a mobile station should be paged, as shown by block 452. Then, before paging the mobile station, the RAN determines whether or not less than a first threshold period of time has elapsed since a last call involving the mobile station ended, as shown by block 454. If less than the first threshold period of time has elapsed since the mobile station's last call ended, then the RAN proceeds to make a rapid page attempt in the sector where the mobile station's last call ended, as shown by block 456.

If, on the other hand, more than the threshold period of time has elapsed since the mobile station's last call ended, the RAN determines whether or not less than a second threshold period of time has elapsed since the last call involving the mobile station ended, as shown by block 458. The second threshold period is typically less than the first threshold period. If less than the second threshold period of time has elapsed since the mobile station's last call ended, then the RAN proceeds to determine whether or not paging-channel occupancy is above a threshold level in at least one sector in the first paging zone other than the sector in which the last call ended, as shown by block 460. If the paging-channel occupancy is above the threshold level in at least one such sector, then the RAN makes a rapid page attempt in in the sector where the mobile station's last call ended, as again shown by block 456. However, if more than the second threshold period of time has elapsed since the mobile station's last call ended and/or if the PAGING-CHANNEL OCCUPANCY is not above the threshold level in at least one sector in the first paging zone other than the sector in which the last call ended, then the RAN may proceed to use a zone-based paging scheme to page the mobile station, as shown by block 462.

Figure 5A:
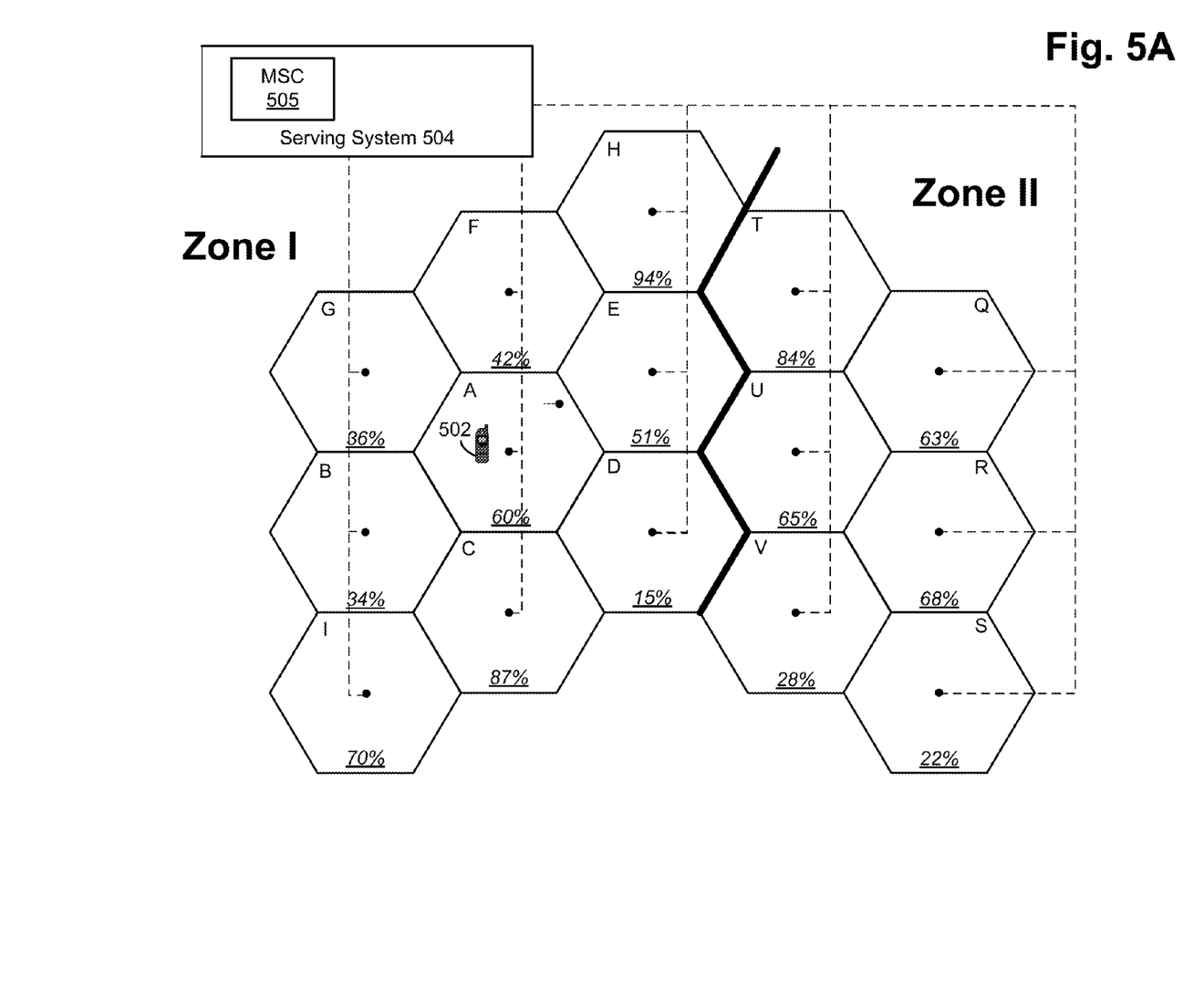
FIG. 5A is a simplified block diagram showing a portion of a radio access network in which an exemplary method could be implemented.

FIG. 5A is a simplified block diagram showing a portion of a RAN 500 in which in exemplary method, such as method 430 of FIG. 4C, could be implemented. As shown, the mobile station 502 is operating in a coverage area that is served by a serving system 504. Herein, a "serving system" includes a switch and other RAN entities that operate together with the switch to provide service in the switch's coverage area of the switch. For example, serving system 504 includes an MSC 505 that is configured to provide service in a coverage area that includes sectors A-H and Q-V. Further, as MSC 505 is configured for zone-based paging, MSC 505 has defined paging zones within its coverage area. Specifically, MSC 505 has defined paging zones I and II, with paging zone I including sectors A-I, and paging zone II including sectors Q-V.

To illustrate the functionality of an exemplary RAN component, take an example where MSC 505 receives an incoming call intended for mobile station 502. In this example, MSC 505 has set the threshold period of time since the end of the last call to be one minute, although it should be understood this period may generally be set as a matter of engineering design choice. Further to this example, the threshold paging-channel occupancy at which MSC 505 deems an attempt to reduce the paging-channel occupancy to be warranted is set at 90%.

Thus, when MSC 505 receives the incoming call for mobile station 502, MSC 505 may first access the CDRs for mobile station 502 to determine whether or not it has been less than one minute since mobile station 502's last call ended. If, for example, the current system time is 4:32:23 PM and the CDRs indicate that the last call ended at 4:31:51 PM in sector A, this means that 32 seconds have passed since the last call. Since MSC 505 takes this as an indication that MSC 505 is likely to still be located in sector A, MSC 505 will proceed to determine if any other sectors in Zone I have a paging-channel occupancy greater than the 90%.

Figure 5B:
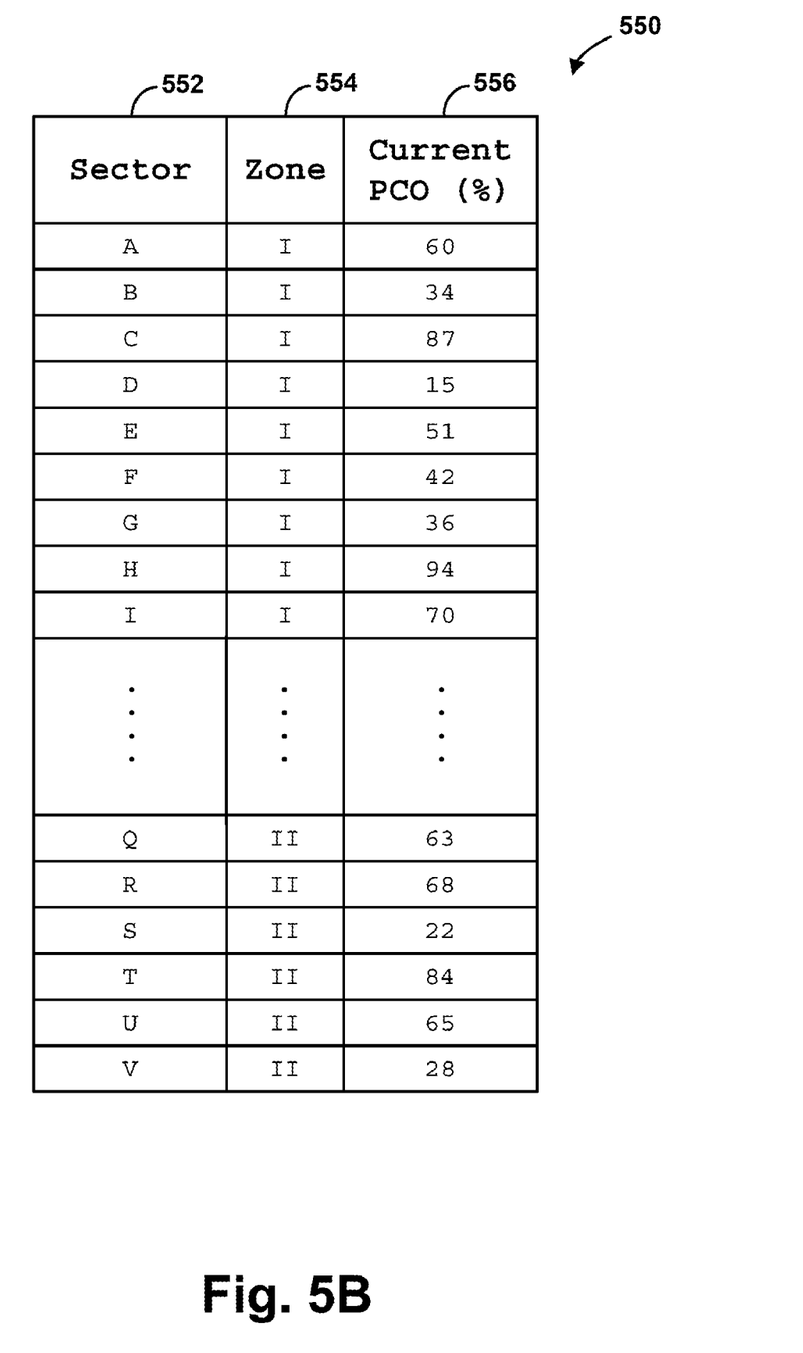
FIG. 5B illustrates a table that corresponds to the state of paging channel resources shown in radio access network of FIG. 5A.

FIG. 5B illustrates a table 550 that corresponds to the state of paging channel resources shown in FIG. 5A and shows, for each sector 552 in zones I and II, data indicating the respective zone 554 to which the sector belongs, as well as the current paging-channel occupancy 556 in the sector. Therefore, once MSC 505 has determined that less than a minute has passed since the last call involving mobile station 502, MSC 505 may access a database having data such as that illustrated by table 550 in order to determine whether any other sectors in the same zone as the last-call sector have a paging-channel occupancy above the threshold paging-channel occupancy, which in this case is 90%.

In particular, MSC 505 may determine from such data that sector A, which is the sector in which the last call ended, is located in zone I. MSC 505 may also determine from table 550 that sectors B-I are also part of zone I, which means that the MSC should evaluate the paging-channel occupancy in these sectors. Accordingly, MSC 505 may use the current paging-channel occupancy data 556 to determine the paging-channel occupancy in sectors B-I, and compare the respective paging-channel occupancies to the threshold paging-channel occupancy. In this example, since the paging-channel occupancy in sector H is 94%, and thus above the threshold of 90%, MSC 505 will make a rapid page attempt to mobile station 602 in sector A.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
   at a radio access network, determining that a mobile station should be paged;
   before sending the page, the RAN determining whether or not both: (i) less than a predetermined period of time has elapsed since a last call of the mobile station ended, wherein the last call ended in a sector within a first paging zone, and (ii) paging-channel occupancy is above a threshold level in at least one sector in the first paging zone other than the sector in which the last call ended;
   if it is determined that both: (i) less than the predetermined period of time has elapsed since the last call of the mobile station ended and (ii) the paging-channel occupancy is above the threshold level in at least one other sector in the first paging zone, then the RAN making a rapid page attempt in the sector of the radio access network in which the last call ended; and
   otherwise, the RAN using a zone-based paging scheme to page the mobile station.

2. The method of claim 1, wherein making a rapid page attempt comprises paging the mobile station in only the sector in which the last call ended.

3. The method of claim 1, further comprising:
   after paging the mobile station in the sector in which the last call ended, waiting for an acknowledgement from the mobile station;
   if the acknowledgement is not received from the mobile station within a predetermined period of time, then using the zone-based paging scheme to page the mobile station.

4. The method of claim 1, wherein determining whether or not both: (i) less than the predetermined period of time has elapsed since the last call of the mobile station ended and (ii) the paging-channel occupancy is above the threshold level in at least one sector in the first paging zone other than the sector in which the last call ended comprises:
   determining whether or not less than a predetermined period of time has elapsed since the last call of the mobile station ended;
   if less than the predetermined period of time has elapsed since a last call, then:
      (a) determining whether or not paging-channel occupancy is above a threshold level in at least one sector in the first paging zone other than the sector in which the last call ended; and
      (b) if the paging-channel occupancy is above the threshold level in at least one sector in the first paging zone other than the sector in which the last call ended, then determining that it is the case that both: (i) less than the predetermined period of time has elapsed since the last call of the mobile station ended and (ii) the paging-channel occupancy is above the threshold level in at least one sector in the first paging zone other than the sector in which the last call ended; and
   otherwise, determining that it is not the case that both: (i) less than the predetermined period of time has elapsed since the last call of the mobile station ended and (ii) the paging-channel occupancy is above the threshold level in at least one sector in the first paging zone other than the sector in which the last call ended.

5. The method of claim 4, wherein determining whether or not less than a predetermined period of time has elapsed since a last call involving the mobile station ended comprises:
    querying a database that provides call detail records (CDRs) to determine a time when the last call of the mobile station ended; and
    determining an elapsed time since the last call of the mobile station ended.

6. The method of claim 1, wherein determining whether or not both: (i) less than the predetermined period of time has elapsed since the last call of the mobile station ended and (ii) the paging-channel occupancy is above the threshold level in at least one sector in the first paging zone other than the sector in which the last call ended comprises:
    determining whether or not paging-channel occupancy is above a threshold level in at least one sector in the first paging zone other than the sector in which the last call ended;
    if the paging-channel occupancy is above the threshold level in at least one sector in the first paging zone other than the sector in which the last call ended, then:
        (a) determining whether or not less than a predetermined period of time has elapsed since a last call involving the mobile station ended; and
        (b) if less than the predetermined period of time has elapsed since a last call, then determining that it is the case that both: (i) less than the predetermined period of time has elapsed since the last call of the mobile station ended and (ii) the paging-channel occupancy is above the threshold level in at least one sector in the first paging zone other than the sector in which the last call ended; and
    otherwise, determining that it is not the case that both: (i) less than the predetermined period of time has elapsed since the last call of the mobile station ended and (ii) the paging-channel occupancy is above the threshold level in at least one sector in the first paging zone other than the sector in which the last call ended.

7. The method of claim 6, wherein determining whether or not paging-channel occupancy is above a threshold level in at least one sector in the first paging zone other than the sector in which the last call ended comprises:
    identifying the sector in which the last call ended;
    identifying a paging zone that includes the sector in which the last call ended as the first paging zone;
    identifying at least one other sector that is included in the first paging zone, other than the sector in which the last call ended;
    determining paging channel occupancy in the at least one other sector; and
    determining whether or not the paging channel occupancy in the at least one other sector is above the threshold level.

8. The method of claim 1, wherein using the zone-based paging scheme to page the mobile station comprises:
    paging the mobile station in a zone in which the mobile station last registered and then waiting for acknowledgement from the mobile station;
    if no acknowledgement is received from the mobile station within a predetermined period of time after paging the mobile station in the zone in which the mobile station last registered, then paging the mobile station in a first expanded paging area and then waiting for acknowledgement from the mobile station, wherein the first expanded paging area comprises the zone in which the mobile station last registered and at least one other zone; and
    if no acknowledgement is received from the mobile station within a predetermined period of time after paging the mobile station in the first expanded paging area then paging the mobile station in a second expanded paging area and then waiting for acknowledgement from the mobile station, wherein the second expanded paging area comprises the first expanded paging area and at least one other zone.

9. A radio access network (RAN) system comprising:
    a non-transitory computer-readable medium; and
    program instructions stored on the non-transitory computer-readable medium and executable by at least one processor to:
        determine that a mobile station should be paged;
        before sending a page to the mobile station, determine whether or not both: (i) less than a predetermined period of time has elapsed since a last call of the mobile station ended, wherein the last call ended in a sector within a first paging zone, and (ii) paging-channel occupancy is above a threshold level in at least one sector in the first paging zone other than the sector in which the last call ended;
        if it is determined that both: (i) less than the predetermined period of time has elapsed since the last call of the mobile station ended and (ii) the paging-channel occupancy is above the threshold level in at least one other sector in the first paging zone, then cause a RAN component to initiate a rapid page attempt in the sector of the radio access network in which the last call ended; and
        otherwise, cause the RAN component to implement a zone-based paging scheme to page the mobile station.

10. The system of claim 9, further comprising program instructions stored on the non-transitory computer-readable medium and executable by at least one processor to:
    after making the rapid page attempt, wait for an acknowledgement from the mobile station; and
    if the acknowledgement is not received from the mobile station within a predetermined period of time, then use the zone-based paging scheme to page the mobile station.

11. The system of claim 9, further comprising program instructions stored on the non-transitory computer-readable medium and executable by at least one processor to:
    determine whether or not less than the predetermined period of time has elapsed since the last call of the mobile station ended;
    if less than the predetermined period of time has elapsed since a last call, then:
        (a) determine whether or not paging-channel occupancy is above a threshold level in at least one sector in the first paging zone other than the sector in which the last call ended; and
        (b) if the paging-channel occupancy is above the threshold level in at least one sector in the first paging zone other than the sector in which the last call ended, then determine that it is the case that both: (i) less than the predetermined period of time has elapsed since the last call of the mobile station ended and (ii) the paging-channel occupancy is above the threshold level in at least one sector in the first paging zone other than the sector in which the last call ended; and
    otherwise, determine that it is not the case that both: (i) less than the predetermined period of time has elapsed since the last call of the mobile station ended and (ii) the paging-channel occupancy is above the threshold level in at least one sector in the first paging zone other than the sector in which the last call ended.

12. The system of claim 11, wherein the determination of whether or not less than the predetermined period of time has elapsed since the last call of the mobile station ended comprises: (a) a query to a database that provides call detail records (CDRs) in order to determine a time when the last call of the mobile station ended and (b) a determination of an elapsed time since the time when the last call of the mobile station ended.

13. The system of claim 9, further comprising program instructions stored on the non-transitory computer-readable medium and executable by at least one processor to:
   determine whether or not paging-channel occupancy is above a threshold level in at least one sector in the first paging zone other than the sector in which the last call ended;
   if the paging-channel occupancy is above the threshold level in at least one sector in the first paging zone other than the sector in which the last call ended, then:
      (a) determine whether or not less than a predetermined period of time has elapsed since a last call involving the mobile station ended; and
      (b) if less than the predetermined period of time has elapsed since a last call, then determine that it is the case that both: (i) less than the predetermined period of time has elapsed since the last call of the mobile station ended and (ii) the paging-channel occupancy is above the threshold level in at least one sector in the first paging zone other than the sector in which the last call ended; and
   otherwise, determine that it is not the case that both: (i) less than the predetermined period of time has elapsed since the last call of the mobile station ended and (ii) the paging-channel occupancy is above the threshold level in at least one sector in the first paging zone other than the sector in which the last call ended.

14. The system of claim 9, further comprising program instructions stored on the non-transitory computer-readable medium and executable by at least one processor to:
   identify the sector in which the last call ended;
   identify a paging zone that includes the sector in which the last call ended as the first paging zone;
   identify at least one other sector that is included in the first paging zone, other than the sector in which the last call ended;
   determine paging channel occupancy in the at least one other sector; and
   determine whether or not the paging channel occupancy in the at least one other sector is above the threshold level.

15. The system of claim 14, wherein the sector in which the last call ended is identified based on one or more call detail records of the mobile station.

16. A method comprising:
   at a radio access network, determining that a mobile station should be paged;
   before sending the page, the RAN determining whether or not both: (i) a rapid page attempt to the mobile station is likely to succeed, wherein a last call of the mobile station ended in a sector within a first paging zone, and (ii) the rapid page attempt to the mobile station is likely to reduce paging-channel occupancy in the first paging zone;
   if it is determined that both: (i) the rapid page attempt to the mobile station is likely to succeed and (ii) the paging-channel occupancy is above the threshold level in at least one other sector in the first paging zone, then the RAN making a rapid page attempt in the sector of the radio access network in which the last call ended; and
   otherwise, the RAN using a zone-based paging scheme to page the mobile station.

17. The method of claim 16, wherein determining whether or not the rapid page attempt to the mobile station is likely to succeed comprises determining whether or not less than a predetermined period of time has elapsed since the last call of the mobile station ended.

18. The method of claim 16, wherein determining whether or not the rapid page attempt to the mobile station is likely to reduce paging-channel occupancy in the first paging zone comprises:
   determining an average paging-channel occupancy for the first paging zone; and
   determining whether or not the average paging-channel occupancy for the first paging zone is above a threshold level.

19. The method of claim 18, wherein the average paging-channel occupancy for the first paging zone comprises an average paging-channel occupancy over all sectors in the first paging zone.

20. The method of claim 18, wherein the average paging-channel occupancy for the first paging zone comprises an average paging-channel occupancy over all sectors in the first paging zone except for the sector in which the last call of the mobile station ended.

* * * * *